Figure 1:
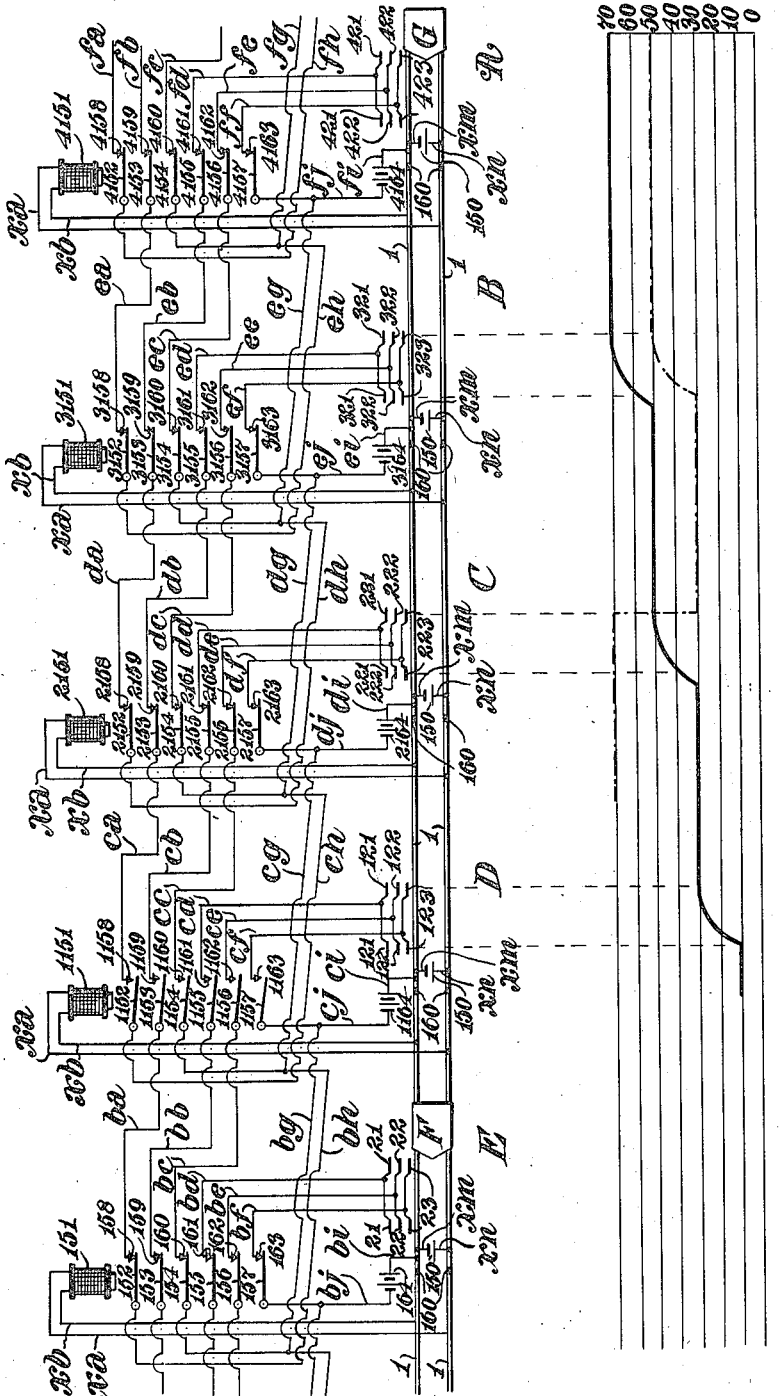

P. J. SIMMEN.
AUTOMATIC SPEED CONTROL FOR RAILWAYS.
APPLICATION FILED AUG. 6, 1915.

1,383,770.

Patented July 5, 1921.
2 SHEETS—SHEET 2.

Inventor:
Paul John Simmen
by William R. Baird
his Atty

UNITED STATES PATENT OFFICE.

PAUL JOHN SIMMEN, OF BUFFALO, NEW YORK.

AUTOMATIC SPEED CONTROL FOR RAILWAYS.

1,383,770. Specification of Letters Patent. Patented July 5, 1921.

Application filed August 6, 1915. Serial No. 44,022.

*To all whom it may concern:*

Be it known that I, PAUL JOHN SIMMEN, a citizen of the United States, residing at Buffalo, in the county of Erie and State of New York, have invented certain new and useful Improvements in Automatic Speed Controls for Railways, of which the following is a specification.

This invention relates to an apparatus for automatically controlling the speed of a vehicle moving along a railway and its novelty consists in the construction and adaptation of the parts as will be more fully hereinafter pointed out.

In Letters Patent of the United States, 1,150,308, dated August 17, 1915, and in another Patent 1,150,309, dated August 17, 1915, I have described an automatic apparatus for controlling the speed of a moving vehicle, which in brief comprises a device moving in accordance with the actual speed of the vehicle, another device moving in accordance with a permissible speed, together with means whereby when the actual speed exceeds the permissible speed at any time, retarding mechanism with which the vehicle is equipped is set into operation to reduce its speed or ultimately to stop the vehicle. The device moving in accordance with a permissible speed is so actuated that in moving from maximum speed to minimum speed a speed distance curve is generated which corresponds to the well known braking curve derived from experimental data.

In another copending application for Letters Patent of the United States, Serial No. 14,075, filed March 13th, 1915, I have described an apparatus for the automatic control of the speed of moving vehicles, which in addition to providing a permissible maximum speed under safety conditions, and a permissible minimum speed under danger conditions, and moving the permissible speed device from maximum speed to minimum speed by means of the speed distance curve, provides for a submaximum position of the permissible speed device upon receipt of a caution signal. In such device, the movement of the permissible speed device from maximum to submaximum position is based on a definite time interval.

The subject matter of the present application is specifically to provide means for setting the permissible speed device in a plurality of submaximum positions, the movement from maximum to any submaximum position being in every case accomplished in accordance with the speed distance curve heretofore described. In the present application, an apparatus is described in which the submaximum speeds result from temporary hazards, the controlling elements being located along the trackway. In other words, a train traveling along a trackway divided into blocks will set up behind itself speed indicator controlling devices whereby the indicated permissible speed for a following train will be automatically and continually decreased as such following train comes closer to the leading train, the reduction in permissible speed being made by steps depending on the number of blocks between the two trains.

In the drawings, there is illustrated a preferred form of apparatus embodying my invention, the parts being shown largely in diagram for the sake of promoting clearness in the description, and the position of the parts on the vehicle being those assumed when a clear signal has been indicated on the vehicle, and the permissive speed indicating shaft and cam have been brought to a maximum position. For purposes of clearness, I have shown three relays, three contact shoes, and three signal rails, which provide two submaximum speeds. It is evident, however, that the number of these elements may be varied by one skilled in the art to suit the varying exigencies of use after the principle of the invention is once understood.

Figure 2:
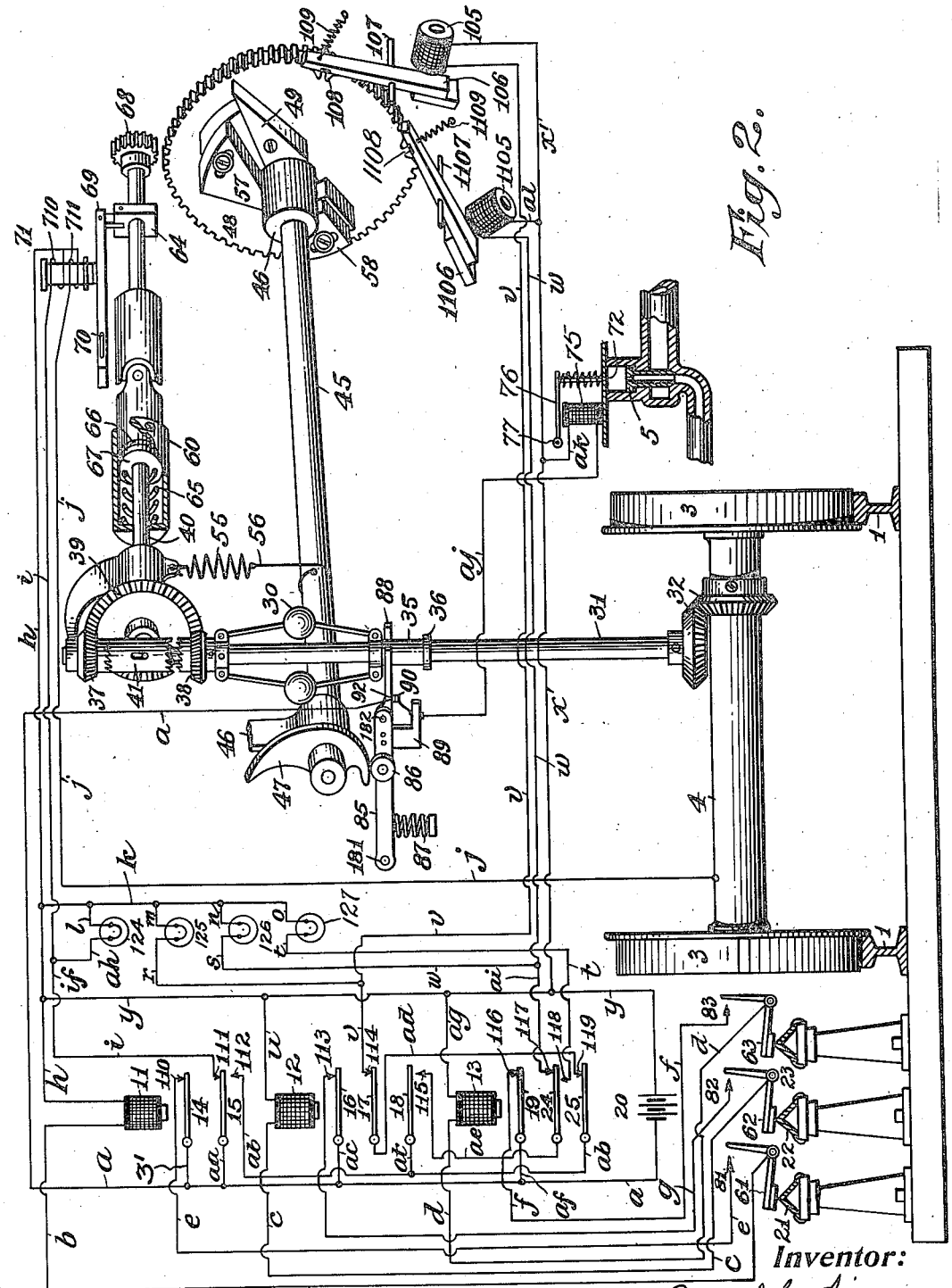

In the drawing, Figure 1 shows in diagram a trackway divided into five blocks and provided with the proper controlling devices, and in the lower part of the figure is shown the relation of a vehicle to the speed curve; and Fig. 2 shows in diagram the devices carried on the vehicle.

In the following description, the electrical conductors are designated by the lower case letters of the alphabet.

The track equipment is as follows: 1, 1 indicate the track rails along which the vehicle is adapted to travel. These rails are divided by insulated joints 160 into blocks A, B, C, D and E. At one end of each block is a track battery 150 connected to the rails by the wires $xm$ and $xn$. At the other end of the block is a track relay 2151 connected to the rails by the wires $xa$ and $xb$. The relay 2151 has six neutral armatures 2152, 2153, 2154, 2155, 2156 and 2157, adapted when the relay is energized to touch contacts 2158, 2159, 2160, 2161, 2162, and 2163 respectively.

At the end of each block, that is at the entrance of another block, are placed home and distant signal rails 121, 122 and 123. The signal rails 122 are nearer to the gage line of the track than signal rails 121, and the signal rails 123 are nearer to the gage line of the track than the signal rails 122. These signal rails are adapted to be energized by the battery 1164 through the armatures and contacts of the various track relays in advance, as will hereinafter be described. A battery 1164 is connected to the track rails by a wire $ci$ and to the various track relays and signal rails by other electrical conductors or wires, which will be more fully described in the description of the electrical circuits hereinafter set forth.

In Fig. 2, there is shown the car equipment. In this figure, 1, 1 indicate the track rails, 3, 3 the wheels of the vehicle, and 4 its axle. The ordinary train pipe air valve controlling the brake system is generally indicated at 5. 61, 62 and 63 are shoes hingedly mounted at a convenient place on the vehicle and adapted to contact with the signal rails 21, 22 and 23 respectively. During such contact with a signal rail, each shoe breaks contact with contact points 81, 82 or 83, and after leaving such signal rail is restored by gravity or spring pressure to its contact point. 11, 12 and 13 are signal relays on the vehicle, being connected with the shoes 61, 62 and 63 respectively. The relay 11 has two neutral armatures 14 and 15 adapted when the relay is energized to touch contacts 110 and 111 respectively. When the relay is deënergized, the armature 15 touches a contact 112. The relay 12 has three neutral armatures 16, 17 and 18, the first two being adapted when the relay is energized to touch contacts 113 and 114 respectively and the armature 18 when the relay is deënergized being adapted to touch a contact 115. The relay 13 has three neutral armatures 19, 24 and 25, adapted when the relay is energized to touch contacts 116, 117 and 119. When the relay is deënergized, the armature 24 is adapted to touch a contact 118. 20 is a local battery mounted on the vehicle. 124 is a clear signal or green light or maximum speed indicator. 125 is a first submaximum speed indicator. 126 is a second submaximum speed indicator and 127 is a danger signal or red light, or minimum speed indicator. The indicators 125 and 126 may be distinguished from each other by using colors, such for example as yellow for 125 and purple for 126, or there may be ground glass inclosures provided for them, which would have the desired submaximum speed displayed upon their surface.

Also mounted on the vehicle is a centrifugal governor 30 moved from a shaft 31 by a gear 32 on the wheel axle 4. On the ball frame of the governor is a sleeve 35 slidable on the shaft 31 and provided with an annular flange 36. At its upper end the shaft 31 is provided with gears 37 and 38, each adapted to mesh with one gear 39 mounted on a shaft 40. Between the gears 37 and 38 is a sleeve 41 slidable on the shaft 31 and indented at both ends to engage similarly indented annular flanges on the gears 37 and 38, but which indentations run in opposite directions whereby the shaft 40 is always rotated in the same direction no matter in which direction the shaft 31 is rotated.

A shaft 45 is mounted in suitable bearings 46, and near one end is provided with a speed control cam 47 and at its opposite end with a gear 48 and a wing 49. A spring 55 and a cord 56 are adapted to retract the shaft 45 to its original position after rotation and release. Detents 57 and 58 are adjustably mounted in the circular path of the wing 49 to limit the extent of the movement of the shaft. The shaft 45 is moved from the shaft 40 by means of a power transmitting mechanism including a friction clutch indicated at 60, a shaft supported and carried by a bearing 64 and a pinion 68 adapted to mesh with the gear 48. The clutch comprises two disks 67 and 66 pressed together by a spring 65 and so arranged that they slip when undue torsional strain is brought upon the shaft. The bearing 64 is suspended from an arm 69 swung upon a pivot 70, the arm being the armature of an electromagnet 71, which is provided with two coils indicated at 710 and 711.

Adjacent to the train air pipe valve indicated at 5 is a magnet 75 having an armature 76 pivoted at 77 and adapted to compress a spring normally adapted to hold open the valve 5, which is a valve such as is well known in the art for permitting the air in the train line to exhaust to the atmosphere and thus apply the brakes when the coil 75 is deënergized.

Hingedly mounted at 181 near the cam 47 is an arm 85 carrying a roller 86 adapted to contact therewith, and a compression spring 87 serves to promote such contact. The arm is provided with a pivot fork 88 hinged at 182 adapted to straddle the collar 35 but to contact with the flange 36. To the arm 85 is fixed a supplemental arm 89 made of insulating material and carrying a contact 90 adapted to touch a similar contact member 92 carried by the arm 85.

Two electromagnets 105 and 1105 are conveniently located near the gear 48, their armatures 106 and 1106 being provided with detents or catches 108 and 1108 to engage with the wing 49 at different predetermined points in its revolution. Tension springs 109 and 1109 serve to hold the armatures normally away from the gear.

Let it be assumed that a train F is standing in block E, and that another train G is approaching and is in block A. The train F will cause the relay 1151 to become deenergized, the other track relays all remaining energized. When the train G reaches a point at which its shoes 61, 62 and 63 are brought into contact with signal rails 421, 422, and 423, the relays 11, 12 and 13 on the vehicle will become energized; the relay 11 through a circuit from the positive side of the battery 4164 to the wires $fj$, $eg$ and $dh$, to the armature 2152, the contact 2158, the wire $da$, the armature 3153, the contact 3159, the wire $eb$, the armature 4155, the contact 4161, the wire $fd$, signal rail 421, shoe 61, wire $b$, relay coil 11, wire $h$, coil 711, wire $j$, axle 4, rails 1, 1 and wire $fi$ to the negative side of battery 4164; the relay 12 through a circuit from the positive side of the battery 4164 to the wires $fj$, and $eg$ to the armature 3154, the contact 3160, wire $ec$, armature 4156, contact 4162, wire $fe$, signal rail 422, shoe 62, wire $c$, relay coil 12, wires $u$, $y$ and $h$, coil 711, wire $j$, axle 4, rails 1, 1 and wire $fi$ to the negative side of battery 4164; and the relay 13 through the circuit from the positive side of the battery 4164 to the wire $fj$, armature 4157, contact 4163, wire $ff$, signal rail 423, shoe 63, wire $d$, relay coil 13, wires $ag$, $y$ and $h$, coil 711, wire $j$, axle 4, rails 1, 1 and wire $fi$ to the negative side of battery 4164.

When the train G reaches a point in block B where its shoes 61, 62 and 63 contact with signal rails 321, 322 and 323, the relay 11 will be deënergized, as the circuit leading to the signal rails 321 is broken at the contact 1158; but the relay 12 will be energized through a circuit from the positive side of the battery 3164 to the wires $ej$, and $dg$, the armature 2154, contact 2160, wire $dc$, armature 3156, contact 3162, wire $ee$, signal rail 322, shoe 62, wire $c$, relay coil 12, wires $u$, $y$ and $h$, coil 711, wire $j$, axle 4, rails 1, 1 and wire $ei$ to negative side of the battery 3164; and the relay 13 will be energized through a circuit from the positive side of the battery 3164 to the wire $ej$, armature 3157, contact 3163, wire $ef$, signal rail 323, shoe 63, wire $d$, relay coil 13, wires $ag$, $y$ and $h$, coil 711, wire $j$, axle 4, rails 1, 1, and wire $ei$ to the negative side of the battery 3164.

When the train G reaches a point in block C where its shoes 61, 62 and 63 contact with signal rails 221, 222 and 223, the relays 11 and 12 will become deënergized as the circuits through the signal rails 221 and 222 are broken at the contacts 1159 and 1160 respectively; but the relay 13 will be energized by a circuit from the positive side of the battery 2164 to the wire $dj$, armature 2157, contact 2163, wire $df$, signal rail 223, shoe 63, wire $d$, relay coil 13, wires $ag$, $y$ and $h$, coil 711, wire $j$, axle 4, rails 1, 1 and wire $di$ to the negative side of the battery 2164.

When the train G reaches a point in block D so that its shoes 61, 62 and 63 contact with the signal rails 121, 122 and 123, the relays 11 and 12 and 13 will all be deënergized as the circuits through the signal rails 121, 122 and 123 are broken at the contacts 1161, 1162 and 1163 respectively.

Whenever the shoe 61 leaves an energized rail 21, the relay 11 will remain energized through the following holding circuit; from the positive side of the battery 20 to the wires $a$ and 3, armature 14, contact 110, wire $e$, contact 81, shoe 61, wire $b$, relay coil 11 and wires $h$ and $y$ to the negative side of the battery 20. Whenever the shoe 61 leaves a deënergized rail 21, the relay 11 will remain deënergized, as its holding circuit is broken at the contact 110.

Whenever the shoe 62 leaves an energized rail 22, the relay 12 will remain energized through the following holding circuit; from the positive side of the battery 20 to the wires $a$ and $ac$, armature 16, contact 113, wire $g$, contact 82, shoe 62, wire $c$, relay coil 12, wires $u$ and $y$ to the negative side of the battery 20. Whenever the shoe 62 leaves a deënergized rail 22, the relay 12 will remain deënergized as its holding circuit is broken at the contact 113.

Whenever the shoe 63 leaves an energized rail 23, the relay 13 remains energized through the following holding circuit: from the positive side of the battery 20 to the wires $a$ and $af$, armature 19, contact 116, wire $f$, contact 83, shoe 63, wire $d$, relay coil 13, wires $ag$ and $y$ to the negative side of the battery 20. Whenever the shoe 63 leaves a deënergized rail 23 the relay 13 will remain deënergized, as its holding circuit is broken at the contact 116.

When the relays 11, 12 and 13 are all energized, the green light 124 glows through a circuit from the positive side of the battery 20 to the wires $a$ and $aa$, armature 15, contact 111, wires $i$ and $ah$, green light 124, wires $l$, $k$, $h$ and $y$ to the negative side of the battery 20, and in such case the coil 710 is also energized through a circuit from the positive side of the battery 20 to the wires $a$ and $aa$, armature 15, contact 111, wire $i$, coil 710 and wires $h$ and $y$ to the negative side of the battery 20.

When the relay 11 is deënergized and the relays 12 and 13 are energized, the coil 710 is deënergized, and the first submaximum speed indicator 125 glows through a circuit from the positive side of the battery 20 to the wires $a$ and $aa$, armature 15, contact 112, wire $ab$, armature 25, contact 119, wire $ad$, armature 17, contact 114, wires $v$ and $r$, light 125, wires $m$, $k$, $h$ and $y$, to the negative side of the battery 20, and in such case the coil 105 is also energized through a circuit from the positive side of the battery 20 to the wires *a* and *aa*, armature 15, contact 112, wire *ab*, armature 25, contact 119, wire *ad*, armature 17, contact 114, wire *v*, coil 105, wires *x* and *y* to the negative side of the battery 20.

When the relays 11 and 12 are deënergized and the relay 13 is energized, the coils 710 and 105 are deënergized, and the second submaximum speed indicator 126 glows through a circuit from the positive side of the battery 20 to the wires *a* and *aa*, armature 15, contact 112, wires *ab at*, armature 18, contact 115, wire *ae*, armature 24, contact 117, wires *ai*, *w* and *s*, light 126, wires *n*, *k*, *h* and *y* to the negative side of the battery 20. The coil 1105 is also energized through a circuit from the positive side of the battery 20 to the wires *a* and *aa*, armature 15, contact 112, wires *ab* and *at*, armature 18, contact 115, wire *ae*, armature 24, contact 117, wires *ai* and *w*, coil 1105, wires *al*, *x* and *y*, to the negative side of the battery 20.

When the relays 11, 12 and 13 are deënergized, coils 710, 105 and 1105 will all be deënergized, and red light or danger signal or minimum speed indicator 127 will glow through a circuit from the positive side of the battery 20 to the wires *a* and *aa*, armature 15, contact 112, wires *ab* and *at*, armature 18, contact 115, wire *ae*, armature 24, contact 118, wire *t*, red light 127, wires *o*, *k*, *h* and *y* to the negative side of the battery 20.

When points 90 and 92 are in contact a circuit is established from the positive side of the battery 20 to the wire *a*, contact 92, contact 90, wire *aj*, coil 75, wires *ak*, *x* and *y* to the negative side of the battery 20. It follows therefore when these points 90 and 92 are not in contact the coil 75 will be deënergized and the air brake will be applied.

The operation of this device is as follows: With a green light glowing the electromagnet 71 is always energized, when the vehicle is on a signal rail, by the coil 710 and 711, and after leaving the signal rail by the coil 710 only. Therefore, the pinion 68 is out of mesh with the gear 48 and the cam 47 will remain in its maximum speed indicating position.

Whenever the first submaximum light 125 is glowing the electromagnet 71 is deënergized as soon as the shoe leaves the signal rail and pinion 68 drops into mesh with the gear 48. At the same time, the coil 105 is energized and the pinion 68 therefore will drive the gear 48 to the first submaximum position where it will be held by the detent 108.

Whenever the second submaximum light 126 is glowing, the magnet 71 is deënergized as soon as the shoe leaves the signal rail, and the pinion 68 is dropped into mesh with the gear 48. At the same time, the coil 1105 becomes energized and the pinion 68 will therefore drive the gear 48 to its second submaximum position, where it will be held by the detent 1108.

Whenever the red light 127 is glowing, the magnet 71 is deënergized and the pinion 68 is dropped into mesh with the gear 48. As the coils 105 and 1105 are then both deënergized, the detents 108 and 1108 will not engage the wing 49 and the pinion 68 will therefore drive the gear 48 to its minimum position.

By reference to Fig. 1, it will be evident that so long as there is a train F in block E, a following train G would be permitted to proceed at maximum speed until it reached the distant rails 321, 322, 323. Between these rails 321, 322, 323, and the home rails 321, 322, 323, the indicated speed would be reduced from the maximum to the first submaximum. From these home rails the train would be limited to the first submaximum speed until it reached the distant rails 221, 222, 223. Between the distant rails 221, 222, 223 to the home rails 221, 222, 223, the indicated speed would be reduced from the first submaximum speed to the second submaximum. From the home rails 221, 222, 223 to the distant rails 121, 122, 123 the train would be limited to the second submaximum speed. Between the distant rails 121, 122, 123 and the home rails 121, 122, 123, the indicated speed would be reduced from the second submaximum to the minimum. From the home rails 121, 122, 123, the train would be limited to the minimum speed of the train F.

It should be noted that the setting up of the submaximum speed indicating signals does not depend upon permanent hazards along the trackway or the location of the signal rails at places determined by the existence of hazards such as crossing, dangerous curves or the like, but depends upon temporary hazards due principally to the presence of a train on the track. In modern steam railway practice, on a level track, a distance of four thousand feet is required to bring a train running at eighty miles per hour to a stop. Using the simple form of automatic speed control disclosed in my application for Letters Patent of the United States Serial No. 439,334, it would be necessary to make each train block four thousand feet in length in order to get full protection for a train near one end of such block against a train entering the block at such speed. But blocks of such length would severely limit the track capacity of a railroad. If, however, the blocks were one thousand feet in length, it is obvious that it would be possible for a train to run at eighty miles per hour with safety if a preceding train were four blocks ahead. If the trains continue to run four blocks apart the second train can always run at such maximum speed. If, however, the second train closes up on the first train so that they are only three blocks apart it is obvious that the maximum speed cannot safely be continued, but if it were reduced say to a first submaximum speed of sixty miles per hour the second train could continue safely to follow the first at the decreased distance interval, because if the preceding train came to a full stop or suddenly slowed down the following train would have a sufficient braking distance to come to a full stop from sixty miles per hour. If the second train should close up on the first train so that they are only two blocks apart, the following train must for safety sake reduce its maximum speed to a new submaximum rate, say forty miles per hour and if the interval between the trains is reduced to one block the safe rate of speed for the following train is reduced to a minimum or that corresponding to danger conditions, say ten miles per hour, at which rate the following train is under control. So if two trains are running in the same direction along the same track it is obvious that the closer the following train is to the one in front, the lower must be the safe rate of speed.

By means of the apparatus herein described it is possible, by the energization or deënergization of the series of signal rails, by the passing of a train over the same to set up in the cab of the following train indications of safe speed at maximum, minimum or intermediate rates. The indications once set persist by means of the holding circuits on the cab until a signal rail is passed from which a different indication is picked up. Morever if the indicated permissible speed is at any time exceeded the brakes are automatically applied without the intervention of the operator.

In the described case three series of signal rails are arranged along the track and three corresponding series of shoes on the train but the principle of the invention is not restricted to the specific form of installation.

Moreover, it is evident that the signal rails of one or more of the series may be energized or deënergized from a train despatcher's office and different speeds thus indicated for a train to suit some emergency condition.

I claim:

1. A safety apparatus for the automatic control of the speed of vehicles moving along a trackway, comprising a permissible speed device on the vehicle movable between a permissible maximum speed position under safety conditions, and a permissible minimum speed position under danger conditions, means for automatically moving the permissible speed device from a maximum to and positively electrically maintaining it at any one of a plurality of submaximum positions or to a minimum position step by step or reversing such movement corresponding to the position of a temporary hazard moving along the same trackway with respect to the vehicle carrying the device.

2. The combination with a railway divided into blocks, each equipped with roadway control mechanism electrically operated, of a safety apparatus carried by a vehicle traveling along the railway, for the automatic control of the speed of such vehicle, including a permissible speed device and means for moving such device to and positively electrically maintaining it at any one of a series of rate indicating positions varying with the proximity of a temporary hazard to the moving vehicle.

3. The combination with a railway divided into blocks, each equipped with roadway control mechanism electrically operated, of a safety apparatus carried by a vehicle traveling along the railway, for the automatic control of the speed of such vehicle, including a permissible speed device and means for moving such device through electrical impulses received through the roadway mechanism to any one of a series of rate indicating positions varying with the proximity of a temporary hazard moving past the rails and depending upon the distance measured in blocks of such hazard from the vehicle.

4. The combination with a railway divided into blocks, each equipped with roadway control mechanism electrically operated, of a safety apparatus carried by a vehicle traveling along the railway for the automatic control of the speed of such vehicle, including a permissible speed device actuated through electrical impulses received through the roadway mechanism, and varying by steps corresponding to the distance measured in blocks of a temporary hazard from such moving vehicle.

5. An apparatus of the character described comprising a permissible speed device, means for automatically moving it from the running gear of a vehicle, and means for automatically placing it in engagement with such running gear to be moved thereby at various speed indicating positions, including a highway control corresponding to the position of a temporary hazard along the highway with respect to the vehicle.

6. A safety apparatus for the automatic control of the speed of a vehicle moving along a trackway divided into blocks comprising a highway control including a plurality of series of control devices each adapted to be employed in the indication of a permissible speed for the vehicle corresponding to the presence of a temporary hazard in a block a distance from the vehicle predetermined with respect to the actuation of each series of control devices.

7. A safety apparatus for the automatic control of the speed of a vehicle moving along a trackway divided into blocks comprising a highway control including a plurality of series of control devices each adapted to be employed in the indication of a permissible speed for the vehicle corresponding to the presence of a temporary hazard in a block a distance from the vehicle predetermined with respect to the actuation of each series of control devices, and which distance is different for each series.

8. A control for a permissible speed device carried by a vehicle comprising means for actuating the device from the running gear of the vehicle, means for placing it in engagement therewith at various speed positions, and means for restoring it either to an original normal maximum speed position or a predetermined submaximum speed position, depending upon the distance from the vehicle of a temporary hazard.

9. A control for a permissible speed device carried by a vehicle comprising means for actuating the device from the running gear of the vehicle, means for placing it in engagement therewith at various speed positions, and means for restoring it either to an original normal maximum speed position or a predetermined submaximum speed position, depending upon the distance from the vehicle of a temporary hazard, and including means along the path traversed by the vehicle arranged at predetermined distances apart whereby the device is moved to a speed position in accordance with the braking curve of a vehicle traversing such distances.

10. An apparatus for the control of vehicles moving along a trackway comprising means on the vehicle adapted by its position to establish a variable permissible speed for the vehicle, and means adapted to retard the vehicle when such permissible speed is exceeded, in combination with signal rails arranged along the highway and electrical controlling devices whereby the speed establishing means is at a maximum speed position when safety conditions are controlling the signal rails and at a minimum speed position when danger conditions are controlling the same signal rails and a further series of signal rails which, as they are passed by the vehicle, through the same electrical controlling devices cause the speed establishing means to move to a predetermined submaximum position depending upon the distance from the vehicle of a temporary hazard.

11. An apparatus for the control of vehicles moving along a trackway, comprising a device on the vehicle movable to different positions to establish a variable permissible speed for the vehicle, means adapted to retard the vehicle whenever such established speed is exceeded, in combination with means along the trackway and electrically controlled devices actuated therefrom whereby the permissible speed establishing device is automatically moved to a predetermined safe speed position by the mere presence of a temporary hazard along the trackway at a predetermined distance from the vehicle.

12. An apparatus for the control of vehicles moving along a trackway comprising a device on the vehicle movable to different positions to establish a variable permissible speed for the vehicle, means adapted to retard the vehicle whenever such established speed is exceeded, in combination with means along the trackway and electrically controlled devices actuated therefrom whereby the permissible speed establishing device is automatically moved to a predetermined safe speed position by the mere presence of a temporary hazard along the trackway at a predetermined distance from the vehicle and automatically moved to a different safe speed establishing position by such presence whenever the distance of the hazard from the vehicle is varied by a definite increment.

13. An apparatus for the control of vehicles moving along a trackway, comprising a device on the vehicle movable to different positions to establish a variable permissible speed for the vehicle, means adapted to retard the vehicle whenever such established speed is exceeded, in combination with means along the trackway and electrically controlled devices on the vehicle actuated therefrom whereby the permissible speed establishing device is automatically moved to a predetermined safe speed establishing position by the mere presence of a temporary hazard along the trackway at a predetermined distance from the vehicle and automatically moved to a different safe speed establishing position by such presence whenever the distance of the hazard from the vehicle is varied by a definite increment, in combination with automatic means for restoring the permissible speed establishing devices on the vehicle to normal position when the temporary hazard is moved a predetermined distance from the vehicle or vanishes.

14. In apparatus of the character set forth, the combination with a vehicle, of a permissive speed device movable to and maintainable at different speed positions, and means controlled by the presence of a hazard in advance of the vehicle for moving the permissive speed device to and positively electrically maintaining it at any of the different speed positions according to the proximity of the hazard to the vehicle.

15. In apparatus of the character set forth, the combination with a vehicle, of a permissive speed device having a normal clear or safety position and movable therefrom to and maintainable at a plurality of successively lower speed positions, and means controlled by the presence of a hazard in advance of the vehicle for moving the permissive speed device to and positively electrically maintaining it at any of the lower speed positions according to the proximity of the hazard to said vehicle.

16. In apparatus of the character set forth, the combination with a trackway for vehicles, of a vehicle that traverses the same, a permissive speed device having a normal clear or safety position and movable therefrom to and maintainable at a plurality of successively lower speed positions, and mechanism dependent on the appearance of a temporary hazard on the trackway and its position with relation to the vehicle to move the permissive speed device to and positively electrically maintain it at a predetermined lower speed position.

17. In apparatus of the character set forth, the combination with a trackway for vehicles, of a vehicle that traverses the same, a permissive speed device having a normal clear or safety position and movable therefrom to and maintainable at a plurality of successively lower speed positions, and mechanism dependent on the appearance of a temporary hazard on the trackway and its position with relation to the vehicle to move the permissive speed device to and maintain it at a predetermined lower speed position and to successively change said permissive speed device to and positively electrically maintain it at other speed positions as the vehicle and hazard relatively approach each other.

18. In apparatus of the character set forth, the combination with a trackway for vehicles, of a vehicle that traverses the same, a permissive speed device having a normal clear or safety position and movable therefrom to and positively electrically maintainable at a plurality of successively lower speed positions, and mechanism dependent upon the appearance of a temporary hazard on the trackway to intermittently move the permissive speed device to different speed positions as the vehicle and hazard relatively approach each other.

19. In apparatus of the character set forth, the combination with a trackway divided into sections, of a vehicle adapted to pass along the trackway, a permissive speed device movable to different speed positions, and track-side mechanism automatically controlled by the relative approach of a hazard and the vehicle through successive track sections to cause the permissive speed device to change to a different position upon the change of the number of track sections between the vehicle and hazard and maintain said permissive speed device in substantially a predetermined position while the vehicle is in one section.

20. In apparatus of the character set forth, the combination with a trackway divided into sections, of a vehicle adapted to pass along the trackway, a permissive speed device movable to different speed positions, and trackside mechanism automatically controlled by the appearance of a hazard in a section in advance of the vehicle to cause said permissive speed device to change successively to different predetermined positions as the vehicle successively passes into different track sections and more closely approaches the hazard, while maintaining the permissive speed device in substantially said respective predetermined positions while in said track sections.

21. In apparatus of the character set forth, the combination with a trackway divided into sections, of a vehicle adapted to pass along the trackway, a permissive speed device movable to different speed positions, and trackside mechanism automatically controlled by the appearance of a hazard in a section in advance of the vehicle to cause said permissive speed device to change successively to different predetermined lower speed positions as the vehicle successively passes into different track sections and more closely approaches the hazard while maintaining the permissive speed device in a substantially fixed position while in a section, said means returning the permissive speed device reversely to different higher speed positions upon the relative separation of the hazard and vehicle by an increasing number of sections.

22. In apparatus of the character set forth, the combination with a vehicle, of means for indicating danger and also a plurality of safe rates of speed for said vehicle under different conditions, and means dependent upon the appearance of a temporary hazard in advance of the vehicle for automatically causing the said means to indicate danger or any of the said safe rates of speed according to the distance between the hazard and the vehicle, maintaining the proper indication while a predetermined distance remains substantially the same, and changed to another indication when a different predetermined distance obtains.

23. In apparatus of the character set forth, the combination with a vehicle, of means for indicating a maximum safety rate of speed, a danger condition and a plurality of intermediate sub-maximum speeds, and means for causing said indicating means to normally indicate the maximum safety rate of speed including controlling mechanism dependent upon the appearance of a temporary hazard in advance of the vehicle for automatically causing the said means to indicate a danger or any of the intermediate rates of speed according to the distance between the vehicle and the hazard.

24. In apparatus of the character set forth, the combination with a vehicle, of means for establishing a maximum safe speed under clear conditions, a minimum safe speed under danger conditions, and a plurality of safe speeds between the two, and means dependent on the appearance of a hazard and the distance between the same and the vehicle for effecting the operation of said means to establish and temporarily positively electrically maintain one of said predetermined safe speeds for the vehicle.

25. In apparatus of the character set forth, the combination with a vehicle, of means for establishing a maximum safe speed under clear conditions, a minimum safe speed under danger conditions, and a plurality of safe speeds between the two, and means dependent on the appearance of a hazard and the distance between the same and the vehicle for effecting the operation of said means to establish and temporarily positively electrically maintain one of said predetermined safe speeds for the vehicle, and to alter said established speed to another speed when a predetermined change takes place in the distance between the vehicle and hazard.

In testimony whereof I affix my signature.

PAUL JOHN SIMMEN.